Feb. 20, 1940. C. L. FOWLER 2,190,708
VEHICLE TRANSPORTING CAR
Filed July 30, 1938 2 Sheets-Sheet 1

INVENTOR.
CHESTER L. FOWLER
BY Henry N. Young
ATTORNEY.

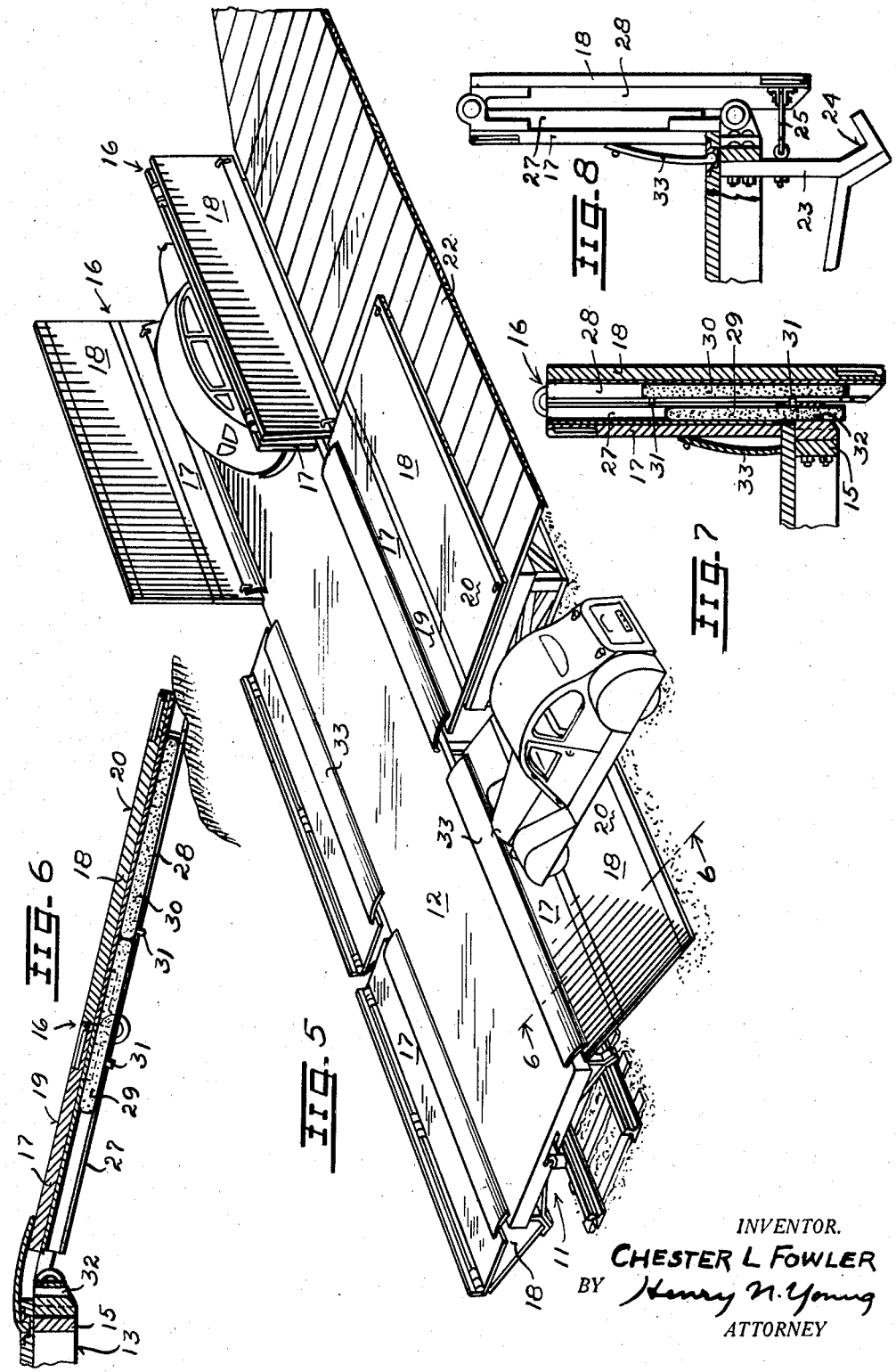

Patented Feb. 20, 1940

2,190,708

UNITED STATES PATENT OFFICE 2,190,708

VEHICLE TRANSPORTING CAR

Chester L. Fowler, Oakland, Calif.

Application July 30, 1938, Serial No. 222,237

13 Claims. (Cl. 105—436)

The invention concerns a railroad or other car which is particularly designed for use in transporting wheeled vehicles and motor trucks, and particularly relates to a means for facilitating the loading and unloading of the vehicles under their own power.

An object of the invention is to provide a means of the character described in unitary association with a vehicle-transporting car for providing a loading ramp leading either from below the level of the car deck or from a loading platform beside the car.

Another object is to utilize the ramp-providing members to provide a lateral extension of the car deck for increasing the maneuvering space thereon, or to provide upright sides for the car during transit thereof.

The invention possesses other objects and features of advantage, some of which, with the foregoing, will be set forth or be apparent in the following description of a typical embodiment of the invention, and in the accompanying drawings in which:

Figure 5 is a perspective view showing different corresponding elements of the device in the various positions shown for them in Figures 1 to 4 inclusive.

Figure 6 is an enlarged fragmentary section at 6—6 in Figure 5.

Figures 7 and 8 are enlarged fragmentary sections at 7—7 and 8—8 respectively in Figure 1.

Figure 1:
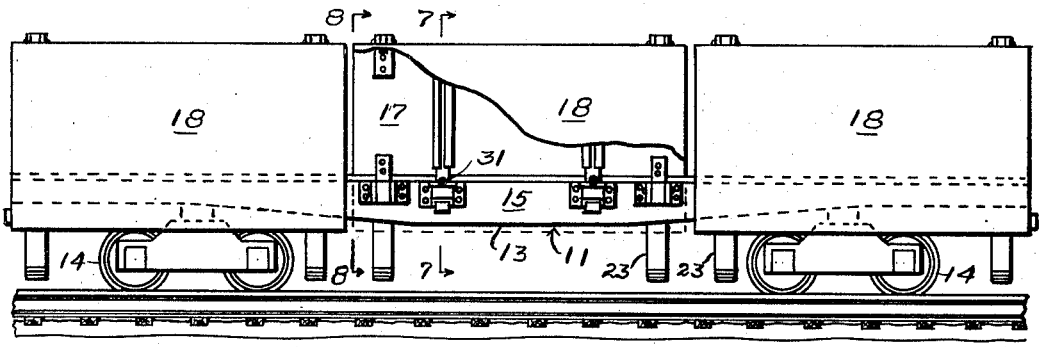
Figure 1 is a side elevation of a railroad flat car equipped with the device of my invention having its elements disposed for the travel of the car, a portion of one element of the device being broken away.

As is particularly illustrated, the device of my invention is applied to a railroad flat-car 11 having a flat deck or floor 12 supported on a usual underframe 13 which is in turn carried on track-engaging wheels 14. The underframe 13 comprises a usual assembly of cross-connected elements which include side sills 15 and has the floor 12 fixed to it.

Figure 2:
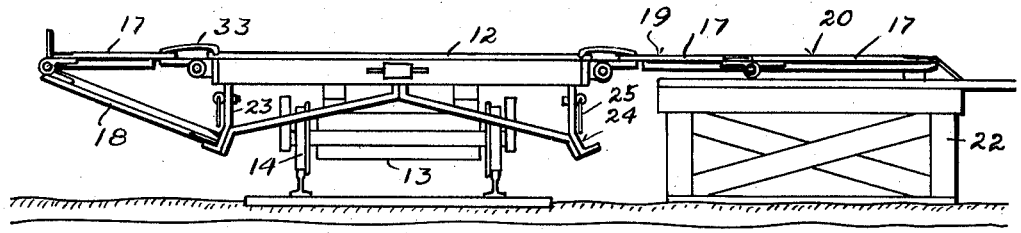
Figures 2 and 3 are end views of the car with the elements of the device variably disposed as for loading or unloading the car.
Figure 3:
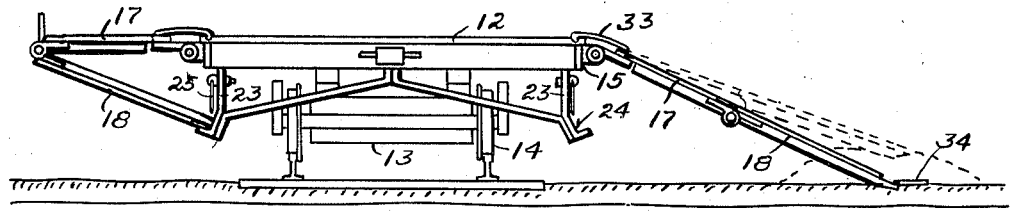

Mutually independent assemblies 16 are mounted at opposite sides of the car for use in accomplishing the various purposes of my invention. The assemblies 16 are alike in structure, and each comprises a rectangular panel member 17 hinged along one side to a side sill 15, and having a rectangular panel member 18 of like length hinged to it at its other side. The hinging of the panels 17 and 18 is such that the panels may be disposed in mutually coplanar relation, and the panel 17 may be placed in the plane of the floor 12, as is shown in Figures 2 and 3. The faces 19 and 20 of the panels 17 and 18 which are uppermost when these panels are extended are flat to provide surfaces for the rolling of the vehicle wheels thereover.

If the car is disposed beside a loading platform 22 having its deck more or less flush with the upper face of the car floor, as is shown in Figures 2 and 5, a connected pair of the panels 17 and 18 may be swung over the platform to provide a ramp between the platform and the car deck, with the panel 17 spanning the gap between the platform and the nearest edge of the car deck and resting on the platform. Where a platform is lacking, connected panels 17 and 18 may be extended and secured in mutually coplanar relation to have the free side edge of the panel 18 engage the ground to provide a sloping ramp extending between the ground and the car deck, this being illustrated in Figures 3 and 5 and 6. It will thus be understood that loading and unloading from the ground is provided for where a loading platform is lacking, as beside a right-of-way away from a station. Loading or unloading of a vehicle may be accomplished either by driving it forward or backward over the positioned ramp and the car deck, as may be most convenient.

When one or more panel assemblies 16 are extended at one side of the car as a ramp means, the panels 17 at the other car side are preferably disposed and held to provide a lateral extension of the car floor thereat. As is particularly shown, lines of brackets 23 depend from the car underframe 13 at the sides thereof and provide seats 24 receiving the free edges of panels 18 when the associated panels 17 extend laterally from the car floor in coplanar relation thereto, whereby the panels 18 which engage bracket seats 24 are operative as struts to support the outer edges of the associated panels 17.

It is noted that the present arrangement for supporting a panel 17 to extend the effective deck area thereat is particularly valuable for facilitating the maneuvering of an automobile on the car deck to or from a longitudinal riding position thereof, the bed of a freight car being too narrow to carry an automobile across its width, or to permit a ready maneuvering of the automobile between upstanding car sides. Since the usual fenders and bumpers of automobiles extend forwardly and rearwardly of the vehicle wheels, the lowering of the car sides in accordance with the present device increases the maneuvering room even if the available floor area is not increased by utilizing the panels 17 as deck extensions.

Figure 4:
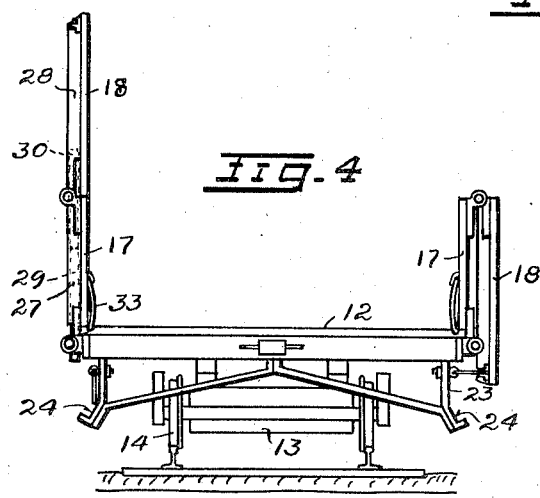
Figure 4 is an end view of the car with elements of the device variably raised to provide sides for the car.

When the present car 11 is to be moved after loading or unloading, the panels 17 are disposed and suitably secured in upright position wherein they are substantially perpendicular to the car deck at its edges as sides for the car. The panels 18 may be left in depending positions opposite and parallel to the upright panels 17, as is brought out in Figures 4 and 5 and 7 and 8, in which case tie links 25 pivoted to the brackets 23 may be releasably engaged with the free edge portions of the panels 18 at the panel backs for securing the latter against the car side. Alternatively, a panel 18 may be disposed and held above the associated panel 17 in the plane of the latter to provide a higher side wall for the car as is illustrated in Figures 4 and 5.

It will now be noted that the panels 17 and 18 mount stiffening members 27 and 28 respectively on the sides thereof opposite their faces 19 and 20, and extending across the panels. The members 27 and 28 are tubular, are aligned in pairs, and the registering pairs thereof each slidably carry locking bars or bolts 29 and 30 for use in securing the panels in various relations and positions. In the present instance, the tubular members 27 and 28 are of rectangular cross-section, and their outer faces with respect to the panels are longitudinally slotted to provide for the protrusion through their slots of pins or knobs 31 which are fixed to and extend laterally from the bars 27 and 28 for use in adjusting the bars along the slideways as may be required. The ends of the slideways of the members 28 nearest the free edges of the panels 18 are closed, and all other slideway ends are open.

By particular reference to Figure 6 wherein the panels 17 and 18 of an associated pair are cooperatively extended to provide a ramp, it will be seen that the outer end of each bar 30 of the assembly engages against the closed end of the guideway of the member 28, the bar 30 is shorter than the guideway space in the member 28, and the bar 29 is gravitally held against the opposed end of the bar 30 while engaged in both of the members 27 and 28 to span the hinging line of the panels. In this manner, the bars 29 are positively operative to retain the panels in mutually coplanar relation for providing a flat ramp on which an automobile or other vehicle may be supported and driven. To release the panels for their mutual swinging into other relations thereof, it is merely necessary to slide the bars 29 entirely into the guideways of the panel 17 manually and by use of the knobs 32 of the bars. It will be understood that the gravity maintenance of the bars 29 in their operative position makes unnecessary the provision of a positive locking means for the bars.

Stake sockets 32 are mounted on the side sills 15 of the car in the planes of movement of the bar-carrying members 27 and 28 and for receiving bars 29 whereby, when a panel 17 is disposed to extend upright above the car floor, the bars 29 of that panel may depend in part from the panel and into the sockets with which they register for securing the panel in upright position. The downward movement of the bars 29 as stakes into the sockets 32 may be suitably limited for the purpose of securing the panel; as shown, the lift pins 31 of the bars 29 are arranged to seat on top of the respective sockets for the purpose. It will be noted that the arrangement provides for a gravital retention of the bars 29 in their operative positions, and that the secured panel may be released for its downward swinging by manually lifting the bars 29 by use of the extending pins 31 thereof.

When the panel 17 is held in upright position by bars 29 in the described manner, and the corresponding panel 18 depends from its upper edge and is secured at its bottom against swinging by links 25, the bars 30 of the panel 18 may remain within its members 28, as is shown in Figure 7. If, however, the panel 18 is swung upright above the panel 17, the bars of the latter panel may drop gravitally into the upper portions of the guideways of the members 27 of the panel 17 to secure the panels in coplanar relation, with the bars 30 spanning the common hinge line of the panels whereby the panels are then cooperative to provide a flat and unitary side wall for the car. Release of the upper panel 18 for its swinging relative to the panel 17 may be simply effected by manually lifting the bars 30 out of their engagement in the members 27 by the aid of the pins 31 on the bars.

Since the bars 29 and 30 are shorter than the guideways provided therefor in the members 27 and 28 respectively of the panels 17 and 18, they may remain in the respective guideways when the panel 18 acts as a brace or strut for supporting the panel 17 in the plane of the car floor, and at other times when they are not in use. The described selective use of the bars 29 and 30 as stakes or bolts is understood to provide a particularly simple and effective means for securing the panels of a pair in different angularly adjusted relations to each other and to the car floor. Furthermore, the bars are in each case arranged to assume and maintain their operative positions solely by gravity, whereby special locking means for the bars are generally unnecessary.

If desired, an apron 33 may be provided to span the gap between the floor edges and the panels 17 when the latter are disposed in the three operative positions therefor which are shown. Each apron 33 would preferably extend for the length of its panel unit 16, and may be hingedly mounted on the car floor as is indicated in Figure 8. The free edges of the panels 18 may hingedly carry aprons 34 for disposal to facilitate the rolling of wheels onto the panels when they form ramp portions. Also, a flap 34 may be provided along the outer edge of the panel 17 for its disposal in upright position to provide a stop at the panel edge when the panel is disposed to provide an extension of the floor 12; in this manner, the driver of a vehicle which is being maneuvered over the car floor may be apprised when a wheel of the vehicle reaches the edge of the available floor space.

It will now be noted that the described provision of the panels 17 and 18 on and in unitary association with a flatcar provides a car for ready use in transporting self-propelled vehicles from point to point. Railroad freight cars are being increasingly used for transporting road vehicles across country which is impassable to the vehicles or has unduly crowded highways, or to particular points which may lack usual loading or unloading facilities, and the present car has been provided to facilitate such a transportation of vehicles by reason of its provision of means for permitting a loading or unloading of vehicles under their own power and substantially anywhere.

A novel and important possibility with the present car device is that of driving a vehicle with its passengers onto the deck of a car and using the vehicle itself to provide a compartment for riding in as the car is moved from point to point; under such a plan, passenger fares may be less and the car becomes a passenger car with respect to the occupants of the vehicle. Tourists in automobiles may be hauled between points of embarkation and debarkation, driving on the highways only where features of interest not on the route of the car are to be seen, and stopping over where desired.

The optional use of the panels 17 and 18 to provide ramps for loading or unloading, temporary floor extensions, and car sides of different heights requires a minimum number of parts for the various purposes. Also, the length of each panel assembly 16 is determined largely by the weight thereof, it being generally preferred that the assemblies be manipulated by hand and by the regular train crew; the number of said assemblies to a car will therefore depend on the weight of the panels and the length of the car, six assemblies being shown in the present instance for purposes of illustration. As is shown, the panels 17 would preferably be of such a width that they extend no higher than the bottom of the vehicle windows when they are in erect position, while the panels 18 are wider and are wide enough to cooperate with the panels 17 to provide a windbreak extending above the vehicle top when such protection is needed. Also, with the panels fully raised at both car sides, the walls provided may support a removable roof or cover (not shown) for completely enclosing the mounted vehicles being transported.

As a modification and elaboration of the disclosed panel arrangement, a power-operated means might be provided for effecting the manipulation of the panels 17 and 18 between their different postions. Also, it might be desirable to provide a means to automatically indicate as to when the locking bars 29 and/or 30 are engaged as desired for the different settings of the panels, or even provide a means which automatically prevents the release of the car brakes unless the bars are properly disposed for one of the upright settings of the panels.

It is to be understood that the device and arrangement which has been disclosed is applicable to motor trucks and drays which are arranged for the transporting of motor vehicles, and that the word "car" as herein used may therefore be broadly construed to apply to other vehicles than freight cars, when said vehicles are arranged for carrying out the herein disclosed invention.

From the foregoing description taken in connection with the accompanying drawings, the advantages of the construction and use of the device will be readily understood by those skilled in the art to which the invention appertains.

While I have described the features and the principle of operation of a structure which I now consider to be a preferred embodiment of my invention, I desire to have it understood that the disclosure is primarily illustrative, and that such changes may be made, when desired, as fall within the scope of the following claims.

I claim:

1. In combination with the bed of a flatcar or the like, a panel member means hinging said panel member to the car bed at a side thereof for its optional and releasably fixed disposal in upright position above the bed to provide a side for the car or in extended position in the plane of the bed to provide an extension of the floor area of the bed or in downwardly sloping position to extend from the car side to the ground to provide an extension of the bed for use as a loading and unloading ramp for the car, and means on the panel for direct engagement and coaction with the car bed entirely below the plane of the upper face thereof to releasably fix the panel in either of said upright or extended positions.

2. In combination with the bed of a flat car or the like, corresponding panel members hinged to the car bed at opposite side edges thereof and each arranged for its optional and releasably fixed disposal in upright position to provide a side for the car or in extended position in the plane of the bed to provide an extension of the floor area of the bed or in downwardly sloping position to extend from the car side to the ground to provide an extension of the bed for use as a loading or unloading ramp for the car, and means directly coactive between the panels and the bed below its floor level for releasably fixing said panels in the first two aforesaid positions thereof.

3. In combination with the bed of a flatcar or the like providing a stake socket at a side edge thereof, a panel member hinged to the car bed at said side edge thereof and arranged for its swinging between an upright position to provide a side for the car and extending and downwardly sloping position with respect to the car bed, and a rigid stake element slidably carried by said panel member and arranged for its gravital disposal and retention in said socket when the panel extends upwardly from the bed to secure the panel in its upright position as a side for the bed.

4. In combination with the bed of a flatcar or the like, a panel, means hinging the panel to the car bed at a side thereof for its optional disposal in an upright position or in a horizontal position to provide an extension of the floor of the bed, members directly coactive between the panel and car bed for releasably securing the panel in its upright position, and a strut means independent of the first means and directly coactive between the panel and a seat provided on the car bed for releasably supporting the panel in its horizontal position.

5. In combination with the bed of a flatcar or the like, a rectangular panel, means hinging said panel along one side edge thereof to a side edge of the car bed, a second panel hinged to the first panel along its opposite side edge, and a bracket means carried by and beneath the car bed and arranged to seat the free side edge of the second panel whereby the last panel in operative as a strut to support the first panel in coplanar relation with the car bed to provide an extension of the latter.

6. In combination with the bed of a flat car or the like, a rectangular panel hinged along one side edge thereof to a side edge of the car bed, a second panel hinged to the first panel along its opposite side edge, for its disposal opposite the first panel, locking bar carried by the first panel and cooperative between the first panel and the car bed to releasably secure the first panel in upwardly extending relation to the car bed, and a hook means coactive between the bed and the second panel to secure the latter to the first panel while the first panel is secured in its upright position and the second panel depends from its hinged edge.

7. In combination with the bed of a flatcar or the like, a rectangular panel hinged along one side edge thereof to a side edge of the car bed, a second panel hinged to the first panel along its opposite side edge, a slideway having portions of like and uniform cross-section provided on the different panels and arranged for their mutual alignment when the panels are mutually coplanar, a locking bar slidable in the slideway portions, and a stake socket fixed to said side edge of the car bed for receiving a portion of said bar as a stake to secure the first panel in fixed angular relation to the bed when the panel extends substantially at right angles upwardly thereof.

8. In combination with the bed of a flatcar or the like, a rectangular panel hinged along one side edge thereof to a side edge of the car bed, a second panel hinged to the first panel along its opposite side edge, members mounted on the panels and providing a slideway having portions of like cross-section on the different panels of a pair thereof and arranged for their mutual alignment when the panels are mutually coplanar, a pair of locking bars slidably engaging said slideway, and a stake socket provided at said side edge of the car bed for receiving a portion of one said bar as a stake to secure the first panel in fixed angular relation to the bed when the panel extends upright therefrom, the second said locking bar being arranged to gravitally rest on the first bar and extend between the two panels when the same extend upwardly in mutually coplanar relation to thereby secure the panels in the latter relation.

9. In combination with the bed of a flatcar or the like, a rectangular panel hinged along one side edge thereof to a side edge of the car bed and arranged for its positioning to extend either upwardly or downwardly from its axis of hinging, a second panel hinged to the first along its opposite side edge and arranged for its disposal in coplanar relation with the first panel in different positions of the former, members providing a slideway having portions of uniform and like cross-section on the different panels of a pair thereof, a pair of locking bars slidable in said slideway and each normally disposed in a different slideway portion, and a stake socket fixed to said edge of the car bed for receiving a portion of one said bar when the first panel extends upwardly from the car bed and as a stake to secure the panel in fixed angular relation to the car bed, the second said locking bar being arranged to gravitally rest on the first bar and extend between the panels when the same extend upwardly in mutually coplanar relation to thereby secure the panels in the latter relation, and the second said bar being arranged for its disposal entirely within the slideway portion of the second panel to have the first bar gravitally rest thereon to extend between the panels for securing the panels together when the panels are coplanar and slope downwardly from the car bed edge to which the first panel is hinged.

10. A means for transporting motor vehicles and their passengers comprising a car having a flat bed, a rectangular and transversely stiff panel extending longitudinally along the bed of the car and hingedly attached along a side edge thereof to a side edge of the car bed for its optional disposal to extend upwardly to provide a car side or downwardly to engage the ground laterally of the car to provide a ramp for the driving thereover of a motor vehicle for its loading or unloading with respect to the car bed and under its own power, and a stake and socket means directly cooperative at said side edge of the car bed to releasably secure the panel in upright position.

11. In combination with the bed of a flat car, a panel member comprising an upright side for the bed, means hinging said panel member to the car bed at a side edge thereof for its swinging to a position in the plane of the bed to provide a flush extension of the floor area of the bed, and means on the panel for direct engagement and coaction with the car bed below the plane of its upper face to releasably fix the panel in said extended position therefor.

12. In combination with the bed of a flat car, a panel member comprising a normally upright side for the bed, means hinging said panel to the car bed at a side edge thereof for its swinging to extend outwardly from the bed for its use as a loading and unloading ramp for the car, and means on the panel for direct engagement and coaction with the car bed entirely below the plane of its upper face to releasably fix the panel in its normal upright position.

13. In combination with the bed of a flatcar or the like, a rectangular panel hinged along one side edge thereof to a side edge of the car bed for its positioning to extend either upwardly or downwardly from its axis of hinging, a second panel hinged to the first along its opposite side edge and arranged for its disposal in coplanar relation with the first panel in different positions of the former, members providing a slideway having portions of uniform and like cross-section on the different panels of a pair thereof, a locking bar slidable in said slideway, and a stake socket fixed to said edge of the car bed for receiving a portion of said bar when the first panel extends upwardly from the car bed and as a stake to secure the panel in fixed angular relation to the car bed, said locking bar being arranged to optionally extend between the panels when the same extend in mutually coplanar relation to rigidly secure the panels in the latter relation.

CHESTER L. FOWLER.